Dec. 1, 1964     D. R. WEDAN     3,159,348
APPARATUS FOR SPRAYING HEAT FUSIBLE PULVERULENT MATERIAL
Filed March 12, 1962     2 Sheets-Sheet 1
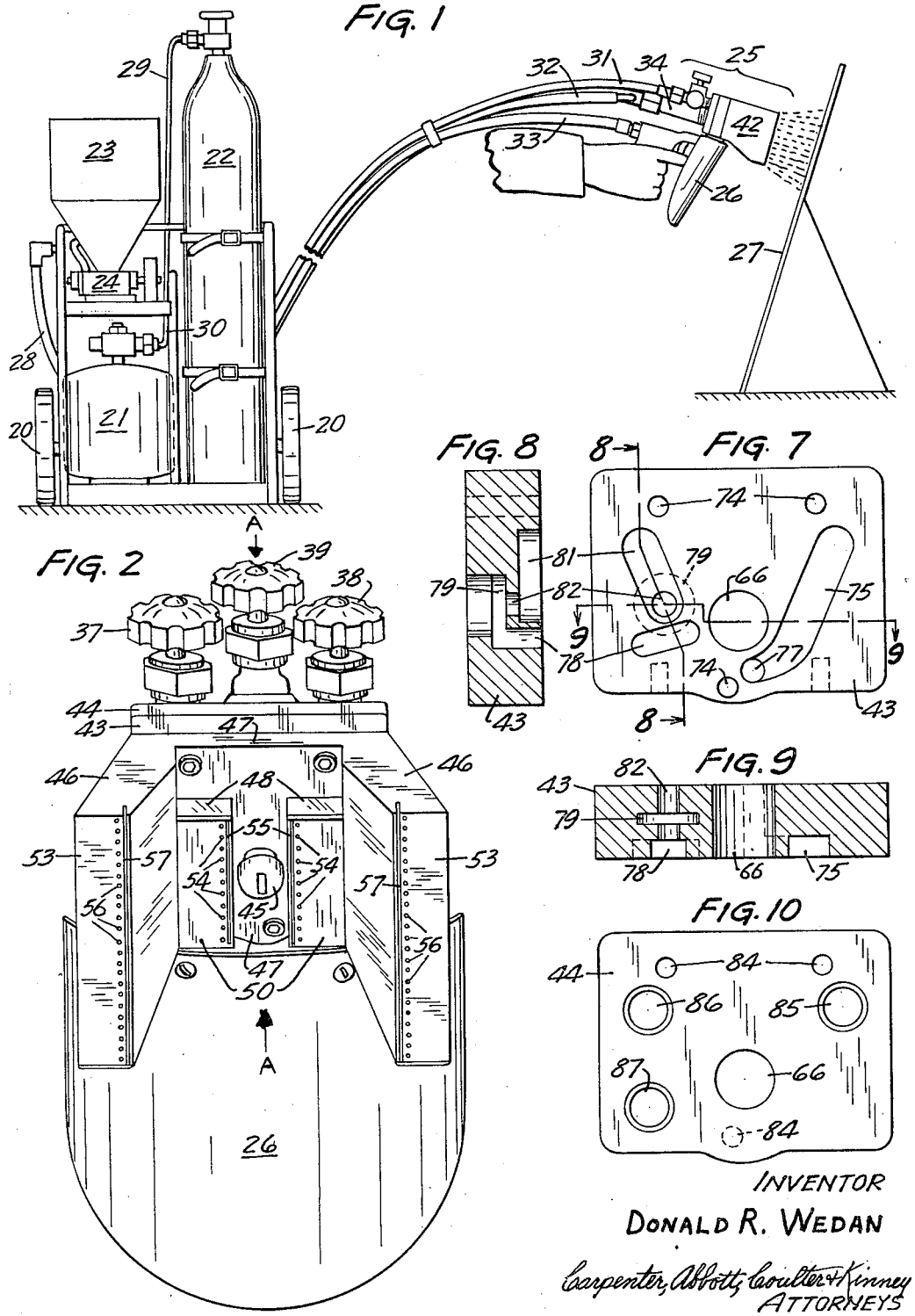
INVENTOR
DONALD R. WEDAN
Carpenter, Abbott, Coulter & Kinney
ATTORNEYS

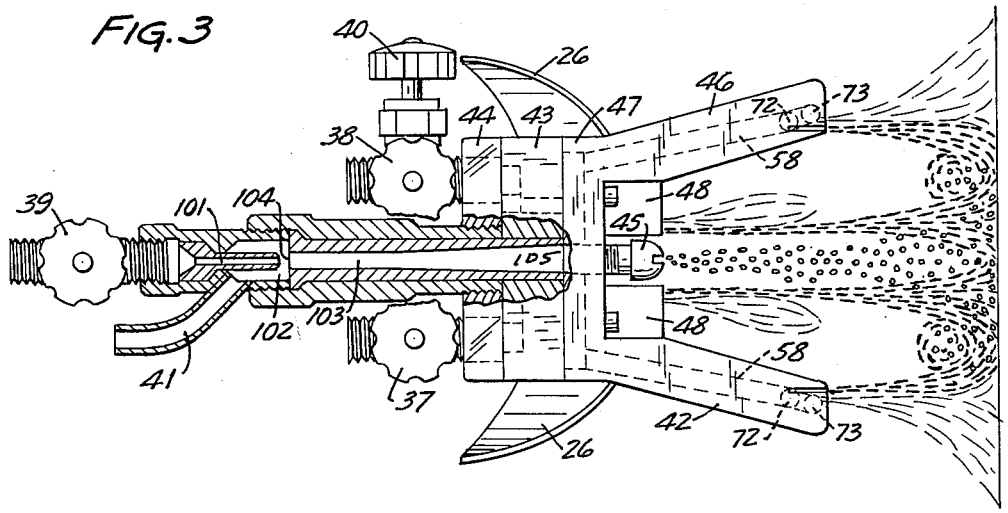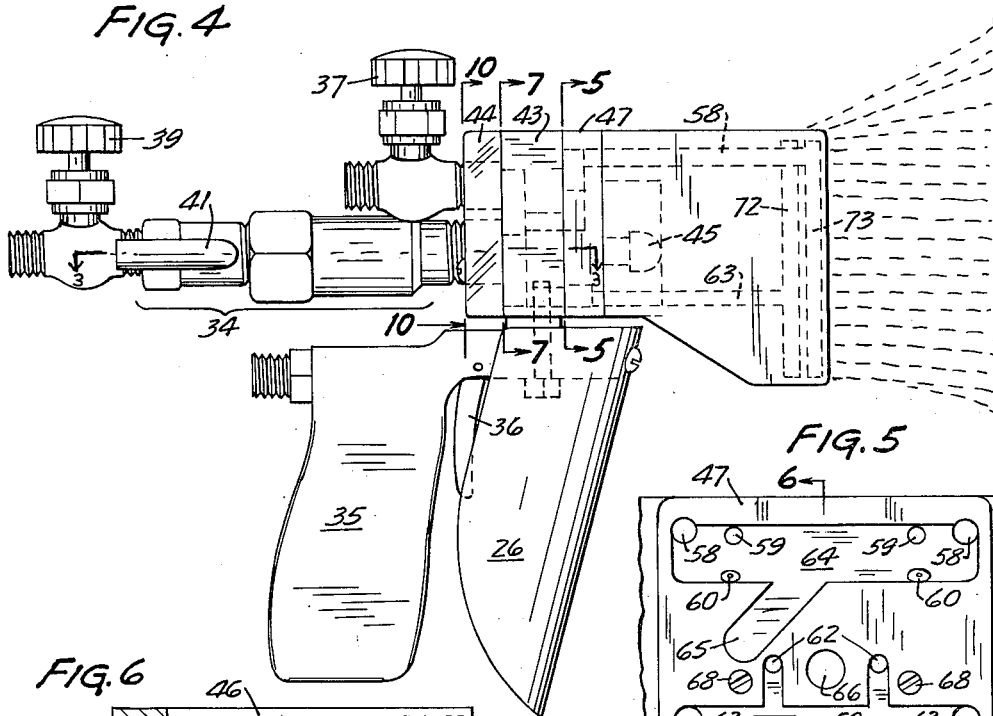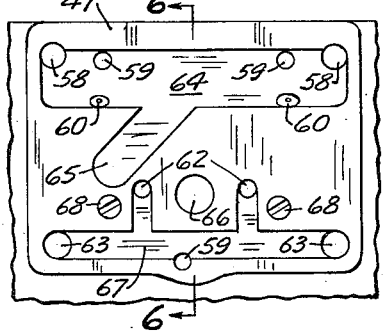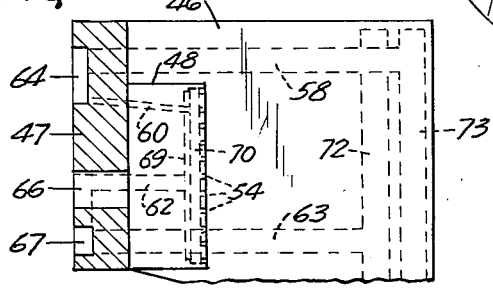
INVENTOR
DONALD R. WEDAN
BY Carpenter, Abbott, Coulter & Kinney
ATTORNEYS United States Patent Office 3,159,348
Patented Dec. 1, 1964

3,159,348
APPARATUS FOR SPRAYING HEAT FUSIBLE
PULVERULENT MATERIAL
Donald R. Wedan, Golden Valley, Minn., assignor to
Minnesota Mining and Manufacturing Company, St.
Paul, Minn., a corporation of Delaware
Filed Mar. 12, 1962, Ser. No. 178,934
7 Claims. (Cl. 239—85)

This invention relates to a new and much improved apparatus and method for spraying heat-fusible pulverulent material upon a surface to be coated, utilizing separate flame-producing means for heating the pulverulent heat-fusible material and for heating the surface to be coated.

More particularly, this invention relates to apparatus and methods for making coatings upon surfaces by a technique which involves (1) heating sprayed heat-fusible pulverulent material, preferably to its fusion temperature, while the sprayed material is traversing its spray path to the surface to be coated, and (2) essentially independently, but concurrently, heating the surface to be coated at least momentarily to temperatures sufficiently high to effect the desired amount of adherence of the sprayed and heated particles of material to the surface as well as the desired amount of coalescence of them into a film thereupon.

The apparatus hereof contains nozzle means for spraying heat-fusible pulverulent material and a first flame-producing means associated with said nozzle means for heating pulverulent material sprayed therefrom. Associated with said nozzle means and said first flame-producing means is an additional flame-producing means, separate from said first flame-producing means, and particularly adapted for use in heating the surface to be coated. This second flame-producing means is spaced outwardly and forwardly of said first flame-producing means in the direction of a surface to be coated. Preferably this apparatus additionally has means for providing a first shield of inert gas between said first flame-producing means and pulverulent material sprayed from said nozzle means. This feature is particularly important where the apparatus is used for spraying combustible organic resin particulate. Preferably also, the apparatus also has means for providing a second shield of inert gas between the second flame-producing means and pulverulent material sprayed from said nozzle means.

Heretofore, the art has generally appreciated how to heat a spray of particulate material for coating. However, known heat-spray techniques have been found generally unsatisfactory where the surface to be coated is cold relatively to the temperature of fusion of particles of heat-fusible material at the time of particle impact. Under such conditions, an inferior coating is produced having a weak bond to the underlying surface; and coalescence of the particles into a smooth film has been difficult to achieve. If the surface to be coated is independently heated prior to such a coating operation, the efficiency of the operation is very low in coating thin substrates, since the heat loss is great in the interval of time existing between surface heating and hot spray coating. Furthermore, many surfaces (e.g., those of heat-combustible material such as wood, special papers, etc.) are capable of withstanding only momentary heating to temperatures as high as those required from fusion of some sprayable particulate desired to be fused thereupon; therefore, conventional pre-heating of such structures cannot always be used as a satisfactory expedient to overcome prior art deficiencies.

By practice of this invention, however, it is possible to prepare well-bonded and smoothly coalesced coatings of sprayed particulate even on substrates which ordinarily would not be expected to withstand the temperatures needed for fusion and/or curing of particulate sprayed thereupon. Critical to the achievement of this result is a special flame-producing means especially adapted to at least momentarily heat a surface to be coated to the desired temperature needed for adherence and coalescence of sprayed particles. Surprisingly, it has been found that, by using the teachings hereof, surfaces to be coated may be protected against heat-destruction by providing a generally weakly adhered insulating coating of material thereupon followed immediately by application of external heat to improve adherent and coalescence without destruction of the underlying substrate material.

The invention will best be understood by reference to the attached drawings, made a part hereof, wherein:

FIGURE 1 is a diagrammatic representation of the apparatus of the invention showing, schematically, the method of its use.

FIGURE 2 is a frontal, perspective view of a preferred embodiment of the wing head for the spray gun of the invention.

FIGURE 3 is a partial cross-section view of the spray gun through line 3—3 of FIGURE 4, and includes a diagrammatic representation, in compact manner, of the flow patterns for materials blown from the spray gun when the same is in use.

FIGURE 4 is an assembly drawing showing a side view of the spray gun, and includes a diagrammatic representation of the flow pattern of heat issuing from the tip of the wing head of the spray gun.

FIGURE 5 is a sectional view taken on plane 5—5 of FIGURE 4, showing feed conduits on the base region of the wing head of the spray gun.

FIGURE 6 is a sectional view taken along plane 6—6 of FIGURE 5.

FIGURE 7 is a sectional view taken on plane 7—7 of FIGURE 4, showing the base of the mixing block for the wing head of the spray gun.

FIGURE 8 is a sectional view taken along line 8—8 of FIGURE 7 through the mixing block for the wing head.

FIGURE 9 is a sectional view taken along line 9—9 of FIGURE 7 through the mixing block for the wing head.

FIGURE 10 is a sectional view taken on plane 10—10 of FIGURE 4 showing the base of the valve block for feed conduits to the spray gun.

Shown schematically in FIGURE 1 is a portable rack on wheels 20. The rack holds a combustible gas (e.g., propane) cylinder 21, a combustion supporting gas or oxygen cylinder 22, a feed hopper 23 for heat-fusible particulate material to be used in coating, a screw feed assembly 24 at the base of the feed hopper for feeding particulate material at a uniform rate into a conduit leading to spray gun 25, and a manifold 28 for feeding an inert gas or non-combustible gas (e.g., air) from an independent supply (not shown) by means of a compressor (not shown) through conduits to the spray gun 25. Elements on the rack are only schematically illustrated inasmuch as they may vary widely as is well understood in this art.

Briefly, the conduits to the spray gun 25 are explained as follows: Inert gas from manifold 28 is fed to the spray gun 25 through conduit 31. Heat-fusible coating material from screw feeder 24 is fed to the gun through conduit 32, and drawn into an inert gas stream (the conduit for the same being not shown) in venturi injector assembly 34 just prior to being blown from the spray gun 25. For clarity of illustration, the combustion gas feed conduit and the combustion supporting gas (i.e., oxygen) feed conduit to the spray gun are omitted from FIGURE 1. Conduit 33 serves merely as a pressure line for air valve control by an operator.

Also shown in FIGURE 1 is a shield 26, which serves as a means for protecting an operator's hand from possibly excessive amounts of heat during a spraying operation.

For simplicity of illustration, the gun in FIGURE 1, with its wing head broadly designated by numeral 42, is positioned closer to a surface being sprayed than would usually be customary in practice, although extremely close proximity of the gun to a surface to be sprayed is not uncommon in practice.

Referring to FIGURE 2, it will be seen that the wing head of the spray gun is preferably bilaterally symmetrical about a hypothetical plane positioned along line A—A. At base region 47 of the wing head is located nozzle 45 for spraying particulate material. This nozzle's mouth is preferably elongated or slotted more or less along this plane of symmetry taken for the wing head, and serves to produce a generally fan-shaped spray pattern of particulate having a generally rectangular cross section. While a single nozzle is shown, those skilled in the art will appreciate that a combination of nozzles could be used so as to achieve a similar result. Preferably, from the standpoint of avoiding build-up of particulate material, the nozzle will be made of a heat-resistant non-thermoadhesive material such as polytetrafluoroethylene, but other materials, including metals, may be used to give satisfactory results.

On either side of the nozzle 45, elevated thereabove in the direction of emerging particulate and spaced laterally therefrom in an arc or line preferably in general parallel relationship to the plane of symmetry for the wing head, are located outlet orifices 54 for a gaseous combustible mixture. Flame combustion supported by gases issuing from these orifices 54 primarily serves the function of heating pulverulent heat-fusible material issuing from nozzle 45 to temperatures either approaching or directly within the fusion range for the particular pulverulent material being sprayed. It is generally important to position orifices 54 at a level not below nozzle 45 in order to avoid over-heating nozzle 45, and thereby causing a build-up of heat-fusible particulate thereupon. Orifices 54 extend in a sufficiently elongated pattern adjacent elongated nozzle 45 so as to supply a flame combustion pattern elongated sufficiently to heat the terminal ends of the elongated patterns of particulate emerging from nozzle 45.

Between combustion supporting gas outlet orifices 54 and nozzle 45 are outlet orifices 55 for creating a shield or wall of non-combustible or inert gas between the spray of heat-fusible particulate material from nozzle 45 and the combustion flames of gases issuing from outlet orifices 54. Outlet orifices 55, preferably linear, are suitably positioned at about the same level as that for flame-supporting gas outlet orifices 54.

Specifically illustrated in FIGURE 2 is a manner in which combustible gas mixture outlet orifices 54 may be appropriately elevated above nozzle 45 in the direction of material issuing therefrom. As there shown, an elevated stage 48 on the base plate region 47 of the wing head is covered by face 50 which contains the combustion supporting gas orifices 54. While the linear outlet orifices 55 for inert gas are also shown in the face 50 of this elevated stage 48, where they preferably are located, it is also suitable to position these orifices 55 at any point below the level illustrated, provided the emerging inert gas furnishes the necessary shield to protect heat-fusible particulate against damage from flames of the combustion supported by gases emerging from orifices 54.

Spaced outwardly of orifices 54 are wings 46, which extend forwardly of nozzle 45 as well as forwardly of orifices 54 in a generally symmetrical pattern, as is preferred. At the forward tip or face 53 of each wing are located an additional series of orifices 56 for issuance of combustion supporting gases. As in the case of orifices 54 for combustible gases, these orifices 56 at the tip or face region of wings 46 are preferably in an elongated pattern of sufficient length to provide a zone of heat at least approximately as elongated as the elongated pattern of resin to be coated upon a substrate under practical use conditions. In effect, the special orifices 56 for combustible gases provide a further zone of heating separate from that supplied by orifices 54; and this further zone is especially designed to heat the surface to be coated, both immediately prior to coating as well as immediately subsequent to deposition of sprayed material thereupon.

Between nozzle 45 and orifices 56 are inert gas outlet orifices 57 for the creation of a further shield of inert gas to protect particulate being sprayed from direct and possibly damaging contact with the flames of combustion from orifices 56. These inert gas orifices 57 are preferably also located in the tip or face region of wings 46, although they may be at a recessed location somewhat behind orifices 56.

Observe that in the illustrated case of both the first pair of inert gas orifices 55 and the second pair of preferably linear inert gas orifices 57, the non-combustible or inert gas wall created serves as a means for stabilizing both the elongated spray pattern of heat-fusible material and the pattern of flames of combustion. While symmetrical arrangement as illustrated is preferred, it should be appreciated that similar results may be achieved by an asymmetrical design.

Referring now to FIGURES 3 and 4, the spray gun may be looked upon as comprising, in its head portion, a wing head 42, a mixing block 43 for transporting materials to the orifices in the wing head, and a valve block 44 (i.e., a block to which valves are affixed).

The base to wing head 42 (see FIGURE 5) contains screw sockets 59 for securing the wing head to the mixing block 43. Channel 58 (see FIGURES 5 and 6) provides passageways for transporting a burnable gas (combustible gas and combustion supporting gas) mixture through to channel 73 and out orifices 56 in the face of the wing heads. Channel 60 (see FIGURES 5 and 6) provides passageways for transporting a burnable gas mixture to channel 70 and out orifices 54 located in elevated stage 48. Enlarged channel 64 receives a mixture of combustible gas and combustion supporting gas through port 65 from mixing block 43, and provides the connecting passage for this mixture into channels 58 and 60, as aforediscussed.

Also shown in FIGURES 5 and 6 is enlarged channel 67, which receives a non-combustible inert gas from mixing block 43 (through a port not shown in FIGURE 5 but located approximately behind the number 59 at the lower portion of FIGURE 5). Channel 67 serves to distribute inert gas to outlet channel 62, through channel 69, to linear outlet orifices 55 located in elevated stage 48, as well as to outlet channel 63, through channel 72, to linear outlet orifices 57 in the face 53 of wings 46.

Channel 66 (see FIGURES 5, 7 and 10) serves as the passageway for particulate material on its way to nozzle 45, as well as the passageway for propelling gases needed to cause forcible spraying of the particulate material.

In mixing block 43 (see FIGURES 7, 8 and 9) channel 75 conducts non-combustible inert gas for shielding or air wall purposes as aforediscussed from port 85 in valve block 44 (see FIGURE 10) through port 77 into enlarged channel 67 (see FIGURE 5).

Within mixing block 43 is located a mixing chamber 79 for mixing combustible gas and combustion supporting gas delivered to the same as follows: Combustion supporting gas (e.g., oxygen) passes from port 86 in valve block 44 (see FIGURE 10) through channel 81 and port 82 into mixing chamber 79. Combustible gas (e.g., propane) passes from port 87 in valve block 44 (see FIGURE 10) through channel 78 into mixing chamber 79.

From mixing chamber 79, the mixture of combustible gas and combustion supporting gas passes through port 65 into enlarged channel 64 (see FIGURE 5).

In FIGURES 5, 7 and 10, numerals 68, 74 and 84 merely designate screw holes or holes for fastening elements to hold parts of the apparatus together.

Referring now particularly to FIGURES 1 through 4, inclusive, and FIGURE 10, valve 37 is fitted in conduit 31 to the spray gun and in port 85 of the valve block 44. This valve serves to control the quantity of non-combustible inert gas fed to the spray gun. Valve 38 in the oxygen line to the spray gun is connected to port 86 of valve block 44, and is adjusted to control oxygen supply to the gun. Valve 40 for supplying combustible gases to the spray gun is in a conduit (not shown in FIGURE 1) connected with port 87 of valve block 44; and it is used to control the supply of combustible gas to the gun.

Valve 39 serves the special function of controlling the propelling gas for spraying particulate matter. Thus, referring particularly to FIGURES 3 and 4, inert propelling gas such as air under pressure is allowed to flow at a controlled rate through valve 39 and on through a restricted and lengthened (e.g., needle-type) primary nozzle 101 toward the mixing section 103 of the injector assembly 34 (see FIGURE 1). This inert gas, passing through the nozzle 101, serves to create a vacuum condition in entrainment area 102 for particulate fed to entrainment area 102 through conduit elbow 41. The high velocity, low pressure mixture of inert gas and particulate in zone 103 is converted to a low velocity, high pressure mixture in zone 105 from whence the mixture passes to nozzle 45. It is this combination of primary nozzle 101, entrainment area 102, zone 103 and zone 105 which comprises the injector assembly. This condition in turn serves to draw particulate material for coating through conduit arm 41 to which connecting hose conduit 32 from screwfeeder 24 is connected. The result is that an essentially uniformly concentrated non-agglomerated mass of particulate coating material is continually drawn through mixing section 103 and forced out nozzle 45.

Use of a gun of this invention in coating operations is remarkably simple. Generally, in preparing the gun for coating, valve 39 for feeding a jet of air through primary nozzle 101 can first be appropriately adjusted or set so as to cause the proper air flow for creating the desired degree of negative pressure in chamber 102 to gain the desired rate of flow for particulate material to be sprayed. This valve may be allowed to remain set so as to produce a continuous flow of inert particulate propelling gas to pass through zones 103 and 105 and out nozzle 45. Then combustion supporting gas valve 38 as well as combustible gas valve 40 is appropriately adjusted to provide the correct feed to maintain flames at orifices 54 and 56. In like manner, particularly where particulate material for coating purposes is selected from amongst those which are degraded by combustion or burning, valve 37 for creating the inert air shield walls issuing from orifices 55 and 57 is appropriately adjusted to prevent spread of flame of combustion into the zone of flow to be taken by the particulate material during spraying, as well as to control to some degree the pattern the particulate material assumes as it traverses its path to a surface to be coated therewith.

Then, in the particular embodiment illustrated in the drawings, feed of the particulate material for spray coating purposes is controlled by an operator who simply pulls the trigger of the spray gun (see FIGURE 1). By pulling the trigger, the pressure in conduit 33 to the trigger is released; this in turn serves to actuate a solenoid which causes actuation of screw feeder 24 for feeding particulate resin into conduit 32 on its way out nozzle 45.

During coating, the spray gun hereof is preferably passed across a surface to be coated by moving the gun such that heat emerging from one wing tip first strikes the surface, particulate material issuing from nozzle 45 then strikes the surface and heat issuing from the other wing of the apparatus finally strikes the coated surface. FIGURE 3 statically illustrates the turbulence factors and flow factors for various materials issuing from a spray gun. Movement of the gun, and consequently the pattern illustrated in FIGURE 3, is preferably in the plane of the drawing in FIGURE 3.

It might be said that the lead wing of the gun serves as a momentary pre-heater of the surface to be coated. Then, immediately after the surface is momentarily heated, particulate material is sprayed through nozzle 45, heated by flames issuing from orifices 54 and impinged upon the heated surface to be coated. It adheres satisfactorily; and in cases where a smooth well-coalesced and well-bonded film coating is desired, the second zone of heat created by flames issuing from the other wing of the apparatus serves to raise the coated material and effect coalescence and strong bonding as well as curing, if the material coated is capable of undergoing cure. Of course, while rather thick coatings may be applied in a single pass of the gun over a surface, it is always possible to build up extra thicknesses by making repeated passes over the surface to be coated. However, a particularly advantageous feature of the apparatus of this invention is that of the elongated or fan-like heat patterns as well as spray pattern for particulate material. This allows an extraordinarily broad strip of substrate to be coated by a single pass, and thus converts impractical heat-spray coating operations into those of an extremely practical nature in view of the rapidity in which they may be accomplished.

While the foregoing description has been in relation to a particular wing head construction, it will be appreciated by those skilled in the art that wing length (i.e., the distance from the wing head base to each wing face) is a function both of the heat pattern desired for surface heating and of the temperature desired for the particles being sprayed at the point where the particles strike a surface to be coated. Wing face shape is dependent upon the shape of the pattern of heated heat-fusible particles. Distance between wing faces and the spray of heated heat-fusible particles is determined mainly by the character of the spray pattern; for example, if the wing is too close to the spray pattern, particles may be over-heated (as is possible when spraying resins) or particles may deposit in excessive quantities upon wing sides adjacent the spray pattern. In general, the design of wings for wing heads of the invention is determined by variables such as spray nozzle design, gas wall linear orifice design, combustible gas orifice design, various gas pressures employed, gas mixing and channelling arrangement, nature of heat-fusible particles to be coated, and the size, shape and contour of the areas to be coated.

In general, any particulate heat-fusible material conventionally employed for heat-spraying is usable in the apparatus and methods of this invention. While the teaching of this invention is particularly useful in coating organic resinous materials having a thermoplastic phase (with or without thermosetting characteristics), it also is useful for applying inorganic coatings such as those of ceramic or metal. Particles for coating may vary in size greatly, but usually will fall in an average size range of from about 0.05 microns up to about 60 U.S. Standard mesh or even as large as 20 mesh or so.

Particularly advantageous results are achieved when using the teachings hereof to coat pulverulent heat-hardenable or thermosettable epoxy resin compositions. As a specific illustration, a blended quick-cure epoxy resin composition of particle size in the range from about 4 mils in average diameter was spray-coated on a variety of substrate surfaces such as metal, wood, glass, paper, etc. The apparatus for coating was set as follows: an air manifold pressure of about 100 pounds per square inch gauge (p.s.i.g.) for the shielding inert gas or air wall, an oxygen pressure of about 30 p.s.i.g., and a propane pressure of about 15 p.s.i.g. The appropriate valves for the gun were opened, the burnable gas mixture ignited, and the valves adjusted so as to produce efficient burning (blue flame). The hopper screw feed was previously adjusted so as to provide a resin feed rate through the spray nozzle of about 5 ounces epoxy resin per minute. A steel plate, coated by passing the gun once slowly across the surface of the plate, was covered with an adherent uniform and continuous layer of resin approximately 10 mils thick. The approximate coating rate was 4 to 6 square feet per minute.

The foregoing description is to be construed as illustrative and non-limitative of my invention.

That which is claimed is:

1. In spray gun apparatus having nozzle means for spraying heat-fusible pulverulent material toward a surface to be coated and first flame-producing means associated with said nozzle means for heating pulverulent material sprayed from said nozzle means, the improvement comprising an additional flame-producing means associated with said nozzle means and particularly adapted for use in heating the surface to be coated, said additional flame-producing means being separate from said first flame-producing means and spaced outwardly and forwardly of said first flame-producing means toward a surface to be coated.

2. The apparatus of claim 1 having means for providing a shield of inert gas between pulverulent material sprayed from said nozzle means and said first flame-producing means.

3. The apparatus of claim 1 having means for providing a shield of inert gas between pulverulent material sprayed from said nozzle means and said additional flame-producing means.

4. Apparatus for spraying heat-fusible pulverulent material upon a surface to be coated, comprising nozzle means for spraying said pulverulent material, first flame-producing means associated with said nozzle means for heating sprayed heat-fusible pulverulent material, and an additional flame-producing means associated with said nozzle means for heating the surface to be coated, said additional flame-producing means being separate from said first flame-producing means and spaced outwardly and forwardly of said first flame-producing means.

5. Apparatus for spraying heat-fusible pulverulent material upon a surface to be coated, comprising nozzle means for spraying said pulverulent material, first flame-producing means associated with said nozzle means for heating sprayed heat-fusible pulverulent material to its fusion temperature, separate flame-producing means associated with said nozzle means for heating the surface to be coated, said separate flame-producing means being spaced outwardly and forwardly of said first heating means, and means to provide a shield of inert gas between pulverulent material sprayed from said nozzle means and said means for producing flame.

6. Apparatus for spraying heat-fusible pulverulent material upon a surface to be coated, comprising a spray head having a base region and at least one wing extending forwardly of said base region, said base region containing nozzle means for spraying heat-fusible pulverulent material and flame-producing means for heating sprayed heat-fusible pulverulent material, and said wing containing in its tip region flame-producing means for heating a surface to be coated.

7. The apparatus of claim 6 having means for providing a shield of inert gas between pulverulent material sprayed from said nozzle means and said means for producing flame in said base region of said spray head.

References Cited in the file of this patent

UNITED STATES PATENTS

| 2,125,764 | Benoit | Aug. 2, 1938 |
| 2,436,335 | Simonsen | Feb. 17, 1948 |
| 2,746,883 | Powers | May 22, 1956 |
| 3,028,257 | Surcheck et al. | Apr. 3, 1962 |

FOREIGN PATENTS

| 953,863 | France | May 30, 1949 |
| 1,054,610 | France | Oct. 7, 1953 |